UNITED STATES PATENT OFFICE.

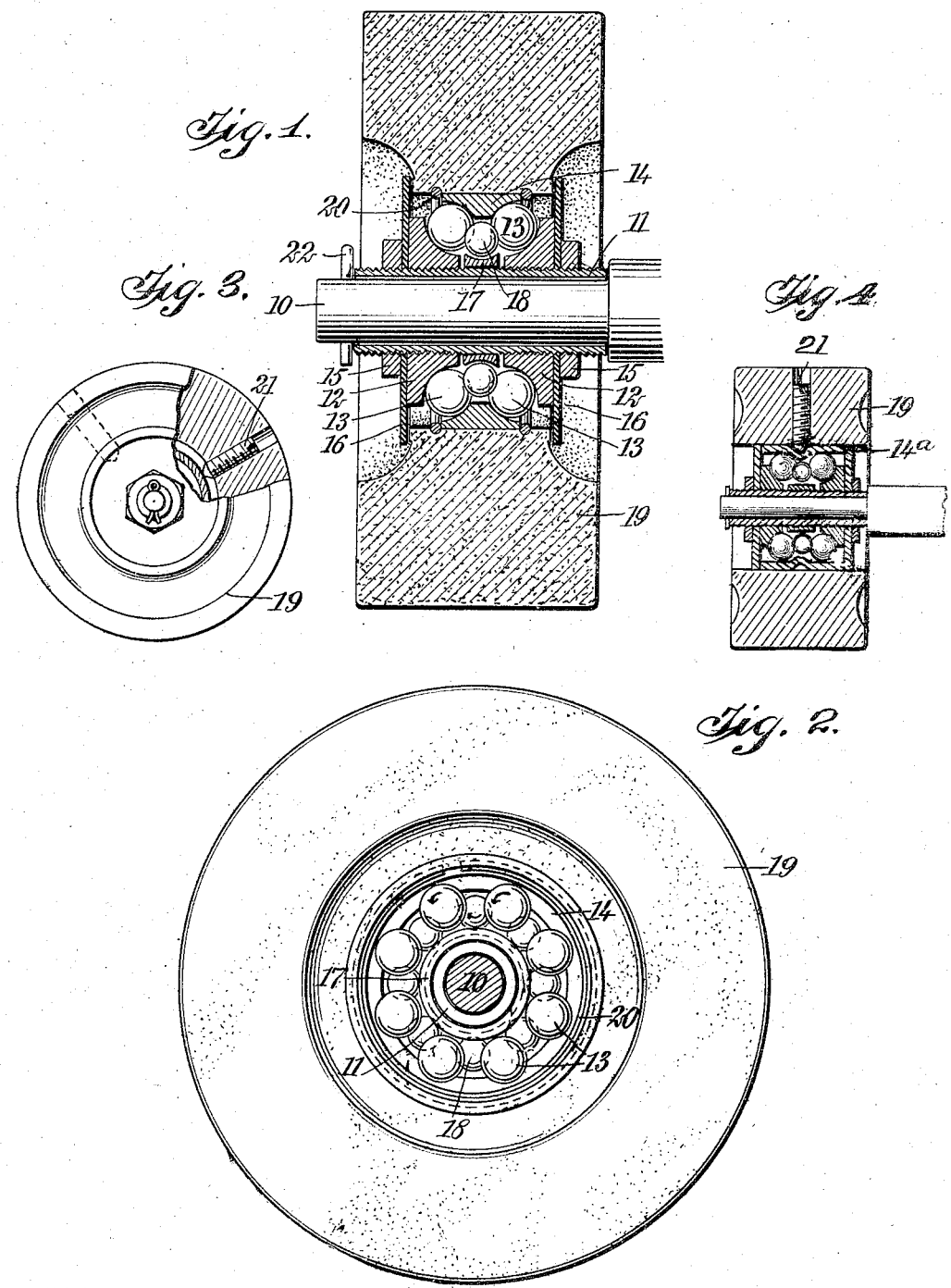

HENRY RICHARDSON PLIMPTON, 2D, OF NEWTON CENTER, MASSACHUSETTS.

ANTIFRICTION-BEARING.

No. 876,836.            Specification of Letters Patent.            Patented Jan. 14, 1908.

Application filed March 26, 1907. Serial No. 364,605.

*To all whom it may concern:*

Be it known that I, HENRY RICHARDSON PLIMPTON, 2d, a citizen of the United States, and a resident of Newton Center, in the county of Middlesex and State of Massachusetts, have invented a new and Improved Antifriction-Bearing, of which the following is a full, clear, and exact description.

This invention relates to certain improvements in anti-friction bearings, and more particularly to that type of bearing in which a plurality of rotatable members, as, for instance, balls or rollers, are held between parts movable in relation to each other.

The object of the invention is to so construct the device that all contacting surfaces will have a rolling rather than a sliding or rubbing engagement with each other, and in order to accomplish this object I provide rotatable spacing members adapted to be moved by centrifugal force to such positions that they serve to hold the load-supporting balls at equal distances from each other and rotate by contact therewith, the outward movement of said spacing members serving not only to separate them from engagement with their raceway but also serving to effect a finer adjustment of the load-supporting balls.

The invention consists in certain features of construction and combination of parts, all of which will be fully set forth hereinafter and particularly pointed out in the claims.

Reference is to be had to the accompanying drawings forming a part of this specification, and in which similar characters of reference indicate corresponding parts in all the figures, and in which Figure 1 is a central longitudinal section of a device embodying one form of my invention; Fig. 2 is an end view thereof, certain of the parts being removed; Fig. 3 is an end view partially broken away, showing a different means for securing the bearing in place within a wheel; and Fig. 4 is a central longitudinal section of the parts shown in Fig. 3.

My improved anti-friction bearing is adapted for use in rotatably mounting one member in respect to another, and is capable of use in a variety of different devices, but for purposes of illustration I have shown the bearing as used in connection with a roller skate wheel and so connected thereto that the roller may be readily removed from the bearing without altering the adjustment of the latter.

In the specific device illustrated in the accompanying drawings, I provide a spindle 10 adapted to be non-rotatably secured to any suitable mechanism and having a sleeve 11 closely fitting but rotatably mounted thereon. To this sleeve are secured the cones or raceways for the balls, and it is evident that the cones or raceways may be secured in any suitable manner. As shown, the sleeve 11 is screw-threaded save for a short distance intermediate its ends, and secured to the sleeve are two cones 12—12 having curved annular raceways facing each other and adapted to support two rows or series of load-supporting balls 13.

Surrounding the balls and forming an outer casing for the bearing, I employ an annular casing 14 having a central ridge, upon each side of which are curved annular raceways adapted to engage with the two rows of balls 13 and hold said balls in the desired position. By moving either of the cones 12 longitudinally upon the sleeve, the proper adjustment of the balls may be readily secured. The cones are held in place upon the sleeve by any suitable means, as, for instance, nuts 15, and intermediate the nuts and the cones I may, if desired, insert felt washers 16 which serve to exclude dust and other foreign matter from contact with the balls or bearing surfaces.

Surrounding the sleeve 11 and rotatably mounted thereon intermediate the two cones 12, I provide an annular member 17 having its circumferential face curved to form a raceway for a third series of balls 18. These last mentioned balls are preferably smaller than the load-supporting balls 13 and serve merely to space the latter and prevent the engagement of any one of the load-supporting balls with the next adjacent one. The annular member 17 and the spacing balls 18 are formed of such sizes in relation to the cones 12 and load-supporting balls 13, that the spacing balls when in engagement with the annular raceway of the member 17 do not necessarily engage with the load-supporting balls, but the parts are so proportioned that no spacing ball can pass out from between its adjacent load-supporting balls. Secured to the annular member 14 in any suitable manner, is the body portion 19 of the roller skate wheel. In the form illustrated in Figs. 1 and 2, the annular member 14 is held within the cylindrical passageway through the body of the skate wheel by means of spring rings 20 fitting within grooves in the body of the wheel and engaging with opposite sides of the annular casing 14.

In the form shown in Figs. 3 and 4, I provide an annular member 14$^a$ having a circumferential groove or depression intermediate its ends, and adapted for engagement in this groove I provide two or more set screws 21 extending inward radially through the body of the wheel and having tapered points. By loosening these screws until the points no longer engage in the groove, the annular member may be removed longitudinally, as is evident from an inspection of the drawings. In employing but two screws I preferably set them at an angle of 120 degrees to each other, whereby the annular member is forced against the portion of the body at a point 120 degrees from each of the screws, thus forming a three-point contact and assuring a firm engagement.

With the body of the wheel firmly secured to the annular member 14 and the latter rotatably mounted in respect to the cones 12 carried by the sleeve 11, the sleeve is placed on the spindle and held from longitudinal movement by any suitable means, as, for instance, a cotter pin 22.

In the operation of my improved bearing, it will be noted that the weight is borne by the load-supporting balls 13 and that the spacing balls 18 bear no weight whatever. As the wheel is caused to rotate in respect to the spindle, the spacing balls 18 move around on the raceway of the member 17 and would normally rotate in the same direction as do the load-supporting balls 13, whereby that portion of the surface of each spacing ball engaging with the load-supporting balls would be moving in the reverse direction from that of the adjacent surface of said load-supporting ball, thus a rubbing or sliding engagement would be formed and the resistance to the free rotation thus materially increased. As soon as the wheel is caused to rotate with sufficient speed, the spacing balls being free to move a short distance radially, are forced outward by centrifugal force until they no longer engage with the annular member 17. The spacing balls contact only with the load-supporting balls and only with the four adjacent load-supporting balls, and as these balls rotate in the same direction, it is evident that the spacing balls rotate merely as idlers and in the reverse direction in respect to the load-supporting balls; thus the spacing balls do not have sliding or rubbing contact with any surface whatsoever and merely have rolling contact with the load-supporting balls. The load-supporting balls being held out of engagement with each other are prevented from rubbing and thus their moving point of contact is in rolling and practically frictionless engagement rather than in sliding or grinding engagement. The spacing balls are thrown out into position solely by centrifugal force, and as the force upon all of the balls is equal, all of them will be thrown out to the same extent and the load-supporting balls will be held at equal distances from each other. The annular member 17 bears no weight whatever and does not even contact with the spacing balls when the wheel is rotated at a high speed. It merely serves to prevent the spacing balls from moving inward to such a position that they may pass the adjacent load-supporting balls, and it is thus evident that the parts may be so proportioned that this member may be entirely omitted. The member when employed is preferably free to rotate on the sleeve 11, whereby any portion of it may be brought uppermost.

In the use of the device on a roller skate, the chief weight would be borne by the cones 12 at the lower portion thereof, and therefore to provide for the equal wearing of all portions of these cones, I preferably allow the sleeve 11 to freely rotate upon the spindle. When the weight is applied to the skate, the friction between the sleeve and the spindle will be sufficiently great to hold the spindle stationary, but as soon as the weight is removed from the skate, the sleeve will be slowly rotated by the rapid and free rotation of the wheel, so that the next time the weight is applied to the skate a different portion of the cones 12 will be in position to receive the wear.

It is evident that the provision of the spacing balls movable to operative position by the action of centrifugal force is not dependent upon the specific construction of the casings, cones and ball raceways, sleeve or wheel, and, therefore, various changes may be made in the shape, size and arrangement of these parts without departing from the spirit of the invention.

Having thus described my invention, I claim as new and desire to secure by Letters Patent:

1. In an anti-friction bearing, the combination of oppositely-disposed members having bearing surfaces, a plurality of rotatable load-supporting members interposed therebetween, and a plurality of rotatable spacing members movable into operating position by centrifugal force.

2. In an anti-friction bearing, the combination of two annular concentric members having oppositely-disposed bearing surfaces, two series of rotatable load-supporting members interposed therebetween and contracting with said surfaces, and a plurality of radially movable rotatable spacing members interposed between said series and between each pair of adjacent load-supporting members.

3. In a roller bearing, the combination of two members having oppositely disposed concentric bearing surfaces, rotatable load-supporting members interposed therebetween, and a plurality of rotatable spacing members adapted when in operative position to contact solely with said load-supporting members the outer surfaces of said spacing members being in rolling engagement with said load-supporting members.

4. In an anti-friction bearing, the combination of two members having oppositely disposed bearing surfaces, rotatable load-supporting members interposed therebetween, and an annular row of rotatable spacing members, each of said spacing members being interposed between a pair of adjacent load-supporting members and when in operative position contacting solely with the bearing surfaces of said load-supporting members.

5. In an anti-friction bearing, the combination of a plurality of members having oppositely disposed concentric bearing surfaces, a plurality of rotatable load-supporting members interposed therebetween, and a plurality of rotatable spacing members movable radially by centrifugal force into engagement solely with said load-supporting members.

6. In an anti-friction bearing, the combination of a plurality of annular members, each having a raceway, a plurality of load-supporting balls interposed between said members and movable in said raceways, and a plurality of spacing balls movable by centrifugal force into operative engagement with said load-supporting balls.

7. In an anti-friction bearing, the combination of two oppositely disposed cones having raceways inclined toward each other, an annular casing having two raceways facing the raceways of said cones, two rows of load-supporting balls interposed between said casing and said cones, and a plurality of spacing balls movable into operative position by the action of centrifugal force.

8. In an anti-friction bearing, the combination of two oppositely disposed cones having raceways inclined toward each other, an annular casing having two raceways facing the raceways of said cones, two rows of load-supporting balls interposed between said casing and said cones, and a plurality of spacing balls radially movable into operative position by the action of centrifugal force.

9. The combination of two annular members having oppositely disposed raceways, a plurality of load-supporting balls interposed therebetween, an annular member having a peripheral raceway, and a plurality of spacing balls adjacent said last mentioned raceway but movable out of engagement therewith by the action of centrifugal force.

10. The combination of two annular members having oppositely disposed raceways, a plurality of load-supporting balls interposed therebetween, a freely rotatable annular member having a peripheral raceway, and a plurality of spacing balls adjacent said last mentioned raceway but movable out of engagement therewith by the action of centrifugal force.

11. The combination of a spindle, a sleeve rotatably mounted thereon, cones mounted on said sleeve, an annular casing having a groove in the circumferential face thereof, balls interposed between said sleeve and said casing, a wheel body surrounding said casing, and adjustable members carried by said body and adapted to engage with said groove.

12. The combination of a spindle, a sleeve rotatably mounted thereon, cones mounted on said sleeve, an annular member having a groove in the circumferential face thereof, balls interposed between said sleeve and said casing, a wheel body surrounding said casing, and radially disposed screws extending through said wheel body and into engagement with said groove.

13. In an anti-friction bearing, the combination of two concentric members having oppositely disposed bearing surfaces, a plurality of rotatable load-supporting members interposed therebetween, the outer of said members having a groove in the circumferential face thereof, a wheel body surrounding said member, and radially disposed screws entering through said wheel body and into engagement with said groove.

14. In an anti-friction bearing, the combination of two concentric members having oppositely disposed bearing surfaces, a plurality of rotatable load-supporting members interposed therebetween, the outer of said members having a depression in the circumferential face thereof, a wheel body surrounding said member and longitudinally movable therefrom, and a radially disposed longitudinally removable fastening member extending through said wheel body and into said depression.

In testimony whereof I have signed my name to this specification in the presence of two subscribing witnesses.

HENRY RICHARDSON PLIMPTON, 2D.

Witnesses:
JAMES L. PLIMPTON,
EDITH ALDEN PLIMPTON.